United States Patent [19]

Watanabe et al.

[11] Patent Number: 5,527,514

[45] Date of Patent: Jun. 18, 1996

[54] DESULFURIZING AND DENITRATING TOWER

[75] Inventors: Teruo Watanabe, Ushiku; Hiromi Tanaka, Abiko; Kouji Kobayashi, Ichihara, all of Japan

[73] Assignee: Sumitomo Heavy Industries, Ltd., Tokyo, Japan

[21] Appl. No.: 324,422

[22] Filed: Oct. 7, 1994

[30] Foreign Application Priority Data

Nov. 18, 1993 [JP] Japan .................. 5-289139

[51] Int. Cl.$^6$ .................. B01D 50/00
[52] U.S. Cl. .................. 422/171; 422/177; 422/190; 422/191; 422/216; 422/239; 55/474; 55/518; 96/150; 96/152; 96/123; 95/275; 95/129; 95/137; 423/239.1
[58] Field of Search .................. 422/169, 171–172, 422/177, 190, 194, 216, 219, 191, 234, 238–239; 96/123, 131, 133, 144, 155, 151, 152; 95/110, 129, 131, 132, 137, 275; 55/350.1, 474, 479, 518; 423/239.1, 240.5, 244.03, 244.01

[56] References Cited

U.S. PATENT DOCUMENTS

| | | | |
|---|---|---|---|
| 4,149,858 | 4/1979 | Noack et al. | 55/474 |
| 4,333,751 | 6/1982 | Iwamura et al. | 422/191 |
| 4,349,362 | 9/1982 | Tanaka et al. | 422/191 |
| 4,670,226 | 6/1987 | Furuyama et al. | 422/177 |
| 5,294,420 | 3/1994 | Ito | 423/239.1 |

FOREIGN PATENT DOCUMENTS

| | | |
|---|---|---|
| 0198133 | 10/1986 | European Pat. Off. |
| 0213287 | 3/1987 | European Pat. Off. |
| 533480 | 3/1993 | European Pat. Off. |
| 2626939 | 12/1977 | Germany |
| 3039477 | 5/1982 | Germany |

Primary Examiner—Robert J. Warden
Assistant Examiner—Hien Tran
Attorney, Agent, or Firm—Nikaido, Marmelstein, Murray & Oram

[57] ABSTRACT

A desulfurizing and denitrating apparatus wherein an inner space of a tower body, which has an introduction port for a gas to be processed and a processed gas discharge port formed respectively in opposite side walls, is partitioned in a direction from the side wall having the processed gas introduction port toward the side wall having the processed gas discharge port by an inlet louver, a perforated plate and an outlet louver all extending vertically parallel to each other, a constant-rate discharging device for setting a moving speed of a carbon-base adsorbent in a small chamber defined between the inlet louver and the perforated plate and a constant-rate discharging device for setting a moving speed of a carbon-base adsorbent in a large chamber defined between the perforated plate and the outlet louver are provided, the moving speed of the carbon-base adsorbent in the small chamber is set to be 2 to 4 times greater than an average moving speed, and the distance from the inlet louver to the perforated plate is set to be 0.1 to 0.2 time the distance from the inlet louver to the outlet louver. The carbon-base adsorbent can be prevented from being loaded with dust in the vicinity of the inlet louver, the $SO_2$ content can be sufficiently lowered in the small chamber, and hence the denitration rate in the large chamber can be increased.

5 Claims, 6 Drawing Sheets

DESULFURIZING AND DENITRATING TOWER

BACKGROUND OF THE INVENTION

1. Field of the Invention

The present invention relates to a desulfurizing and denitrating tower.

2. Description of Related Art

In a prior art desulfurizing and denitrating tower, a catalyst is contained in a moving bed, which has two louvers parallel to each other, so as to move in the moving bed from above toward below. A gas to be processed is supplied to the moving bed from one louver and is discharged through the other louver.

Figure 2:
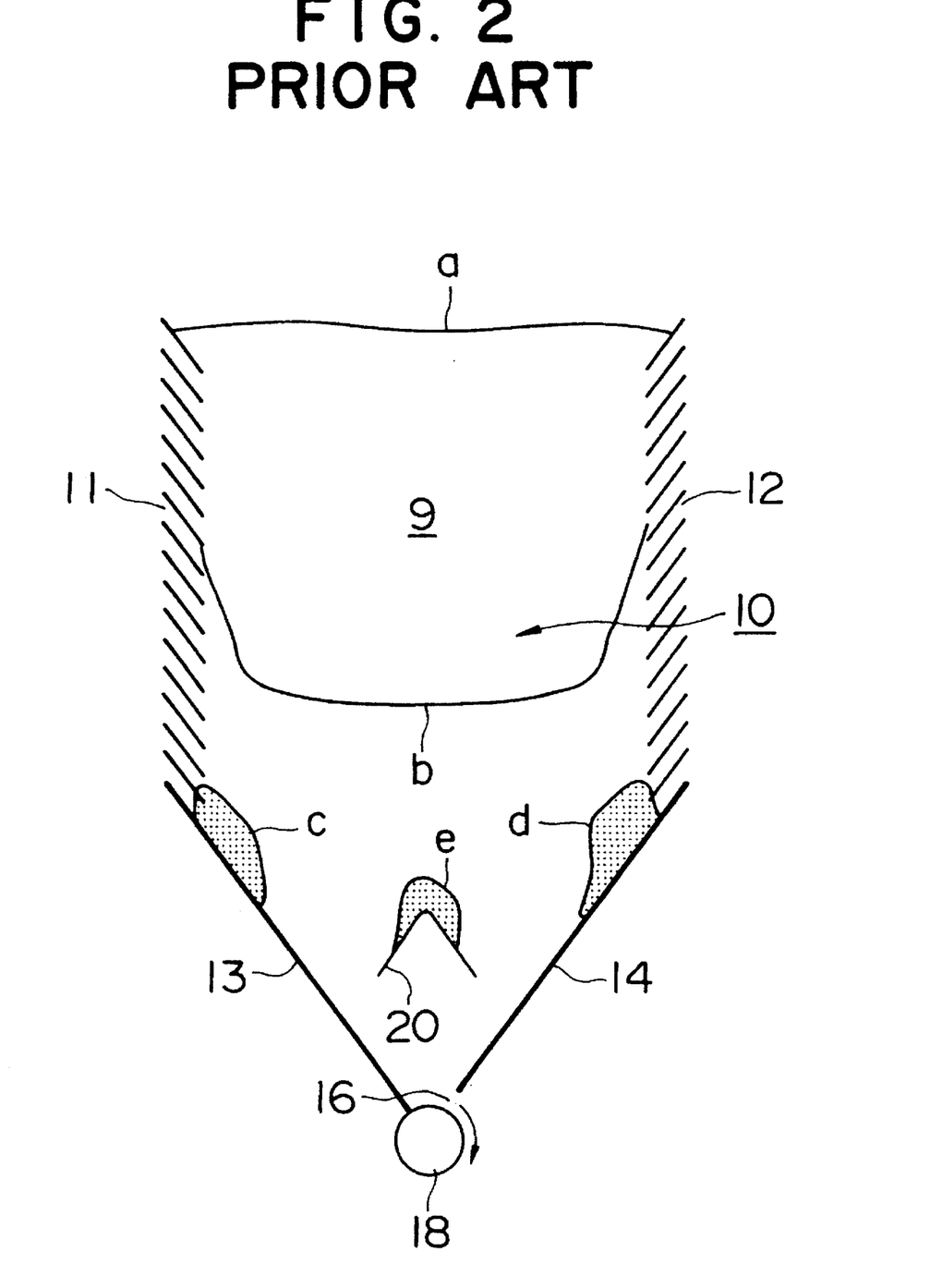
FIG. 2 is a sectional view of main parts of a prior art desulfurizing and denitrating tower.

FIG. 2 is a sectional view of main parts of the prior art desulfurizing and denitrating tower.

As shown in FIG. 2, a moving bed 10 containing a catalyst 9 is formed by an inlet louver 11 and an outlet louver 12 disposed parallel to each other to surround the moving bed 10 from both sides. Two front and rear lower walls 13, 14 are extended downwardly obliquely from respective lower ends of the inlet louver 11 and the outlet louver 12. The spacing between the lower walls 13, 14 is gradually narrowed toward below, and a discharge port 16 for the catalyst 9 is formed at lower ends of the lower walls 13, 14.

A discharge roller 18 is provided in such a manner as to be partly located in the discharge port 16. The catalyst 9 supplied to an upper end of the moving bed 10 is moved gradually downwardly in the moving bed 10 upon rotation of the .discharge roller 18 so that the catalyst is discharged through the discharge port 16 at a constant rate. A deflecting cone 20 having an inverted-V shape in cross-section is disposed in a lower region of the moving bed 10 in opposite relation to the discharge port 16 for smoothing the downward movement of the catalyst 9.

On the other hand, a gas to be processed is supplied to the moving bed 10 through the inlet louver 11 and is desulfurized and denitrated while moving transversely, followed by being discharged through the outlet louver 12.

Figure 3:
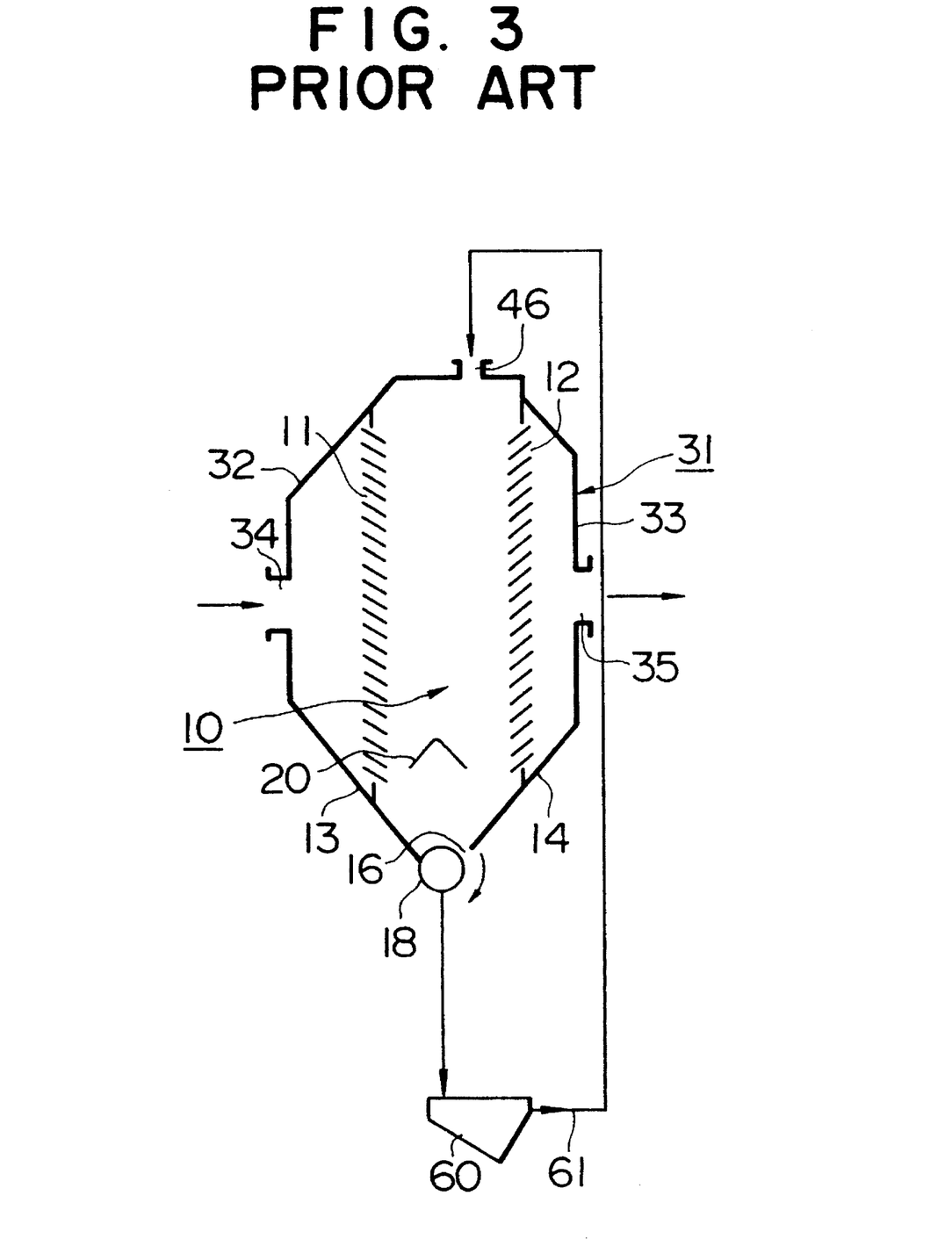
FIG. 3 is a schematic view of the prior art desulfurizing and denitrating tower.

FIG. 3 is a schematic view of the prior art desulfurizing and denitrating tower.

In FIG. 3, a processed gas introduction port 34 and a processed gas discharge port 35 are formed respectively in opposite side walls 32, 33 of a tower body 31. An inner space of the tower body 31 is partitioned by the inlet louver 11 and the outlet louver 12 disposed parallel to each other with the moving bed 10 defined between the inlet louver 11 and the outlet louver 12.

In this tower, a gas to be processed enters the moving bed 10 from the processed gas introduction port 34 through the inlet louver 11. The processed gas is sufficiently contacted with the catalyst 9 (FIG. 2) in the moving bed 10, and then reaches the processed gas discharge port 35 after passing the outlet louver 12.

On the other hand, the catalyst 9 for desulfurizing and denitrating the processed gas is supplied to the moving bed 10 from a supply port 46 formed at an upper end of the tower body 31, and is moved downwardly in the moving bed 10 to reach the discharge port 16.

The discharge roller 18 is disposed in the discharge port 16 and is rotated at a predetermined speed so that the catalyst 9 in the moving bed 10 is moved downwardly at a predetermined moving speed and is then discharged through the discharge port 16.

The catalyst 9 discharged through the discharge port 16 is circulated to the supply port 46 through a line 61 with a regenerative unit (e.g., a sieving or screening unit) 60 disposed in the line 61.

In the prior art desulfurizing and denitrating tower described above, however, a distribution of the catalyst 9 supplied to the moving bed 10 in a pattern a is changed as represented by a pattern b while the catalyst is moving downwardly in the moving bed 10. Accordingly, a uniform flow of the catalyst 9 can not be created in the moving bed 10, and the moving speed of the catalyst 9 is lowered in the vicinity of the inlet louver 11. As a result, the catalyst 9 is loaded with dust contained in the processed gas in the vicinity of the inlet louver 11. Also, the catalyst 9 tends to stagnate in a boundary portion c between the inlet louver 11 and the lower wall 13, a boundary portion d between the outlet louver 12 and the lower wall 14, as well as an upper surface e of the deflecting cone 20. Furthermore, the desulfurization rate achieved by the catalyst 9 in the moving bed 10 cannot be increased and the processing cost is raised correspondingly.

SUMMARY OF THE INVENTION

In view of the above-mentioned problems in the prior art desulfurizing and denitrating tower, an object of the present invention is to provide a desulfurizing and denitrating tower in which a gas to be processed is desulfurized and denitrated by using a carbon-base adsorbent, the carbon-base adsorbent is prevented from being loaded with dust in the vicinity of an inlet louver, and the desulfurization rate can be increased without stagnation of a catalyst.

To achieve the above object, according to the present invention, there is provided a desulfurizing and denitrating apparatus comprising a tower body having a first side wall provided with an introduction port for a gas to be processed and a second side wall provided with a processed gas discharge port and disposed in opposite relation to the first side wall, an inlet louver provided in the tower body to face the first side wall, a perforated plate disposed in the tower body parallel to the inlet louver on the side away from the first side wall so as to define a small chamber between the inlet louver and the perforated plate in which a carbon-base adsorbent is contained, an outlet louver disposed between the perforated plate and the second side wall in the tower body parallel to the perforated plate so as to define a large chamber between the perforated plate and the outlet louver in which a carbon-base adsorbent is contained, a constant-rate discharging device disposed below the small chamber for setting a moving speed of the carbon-base adsorbent in the small chamber, a constantrate discharging device disposed below the large chamber for setting a moving speed of the carbon-base adsorbent in the large chamber, and means for setting the moving speed of the carbon-base adsorbent in the small chamber to be 2 to 4 times greater than an average moving speed.

In the desulfurizing and denitrating apparatus of the present invention, preferably, the distance from the inlet louver to the perforated plate is set to be 0.1 to 0.2 time the distance from the inlet louver to the outlet louver.

Also preferably, the perforated plate has a number of holes whose diameter is set to be 2 to 4 times greater than a diameter of the carbon-base adsorbent.

With the present invention, the carbon-base adsorbent is moved from top toward bottom in each of the small chamber and the large chamber. The processed gas is first supplied to the small chamber through the inlet louver and is then supplied from the small chamber to the large chamber, followed by being discharged from the large chamber through the outlet louver.

The moving speed of the carbon-base adsorbent in the small chamber is set to be 2 to 4 times greater than an average moving speed of the combined carbon-base absorbent combined tower so that the combined carbon-base adsorbent can be prevented from being loaded with dust contained in the processed gas in the vicinity of the inlet louver.

The distance from the inlet louver to the perforated plate is set to be 0.1 to 0.2 time the distance from the inlet louver to the outlet louver so that a desulfurization rate of $SO_2$ in the small chamber is increased and an $SO_2$ content in the large chamber can be lowered.

With another aspect of the desulfurizing and denitrating tower of the present invention, the perforated plate has a number of holes whose diameter is set to be 2 to 4 times greater than the diameter of the carbon-base adsorbent so that it is possible not only to prevent the carbon-base adsorbent from entering the holes and making the perforated plate clogged, but also to prevent the carbon-base adsorbent in the large chamber from moving into the small chamber through the perforated plate.

DESCRIPTION OF THE PREFERRED EMBODIMENT

An embodiment of the present invention will hereinafter be described in detail with reference to the drawings.

Figure 1:
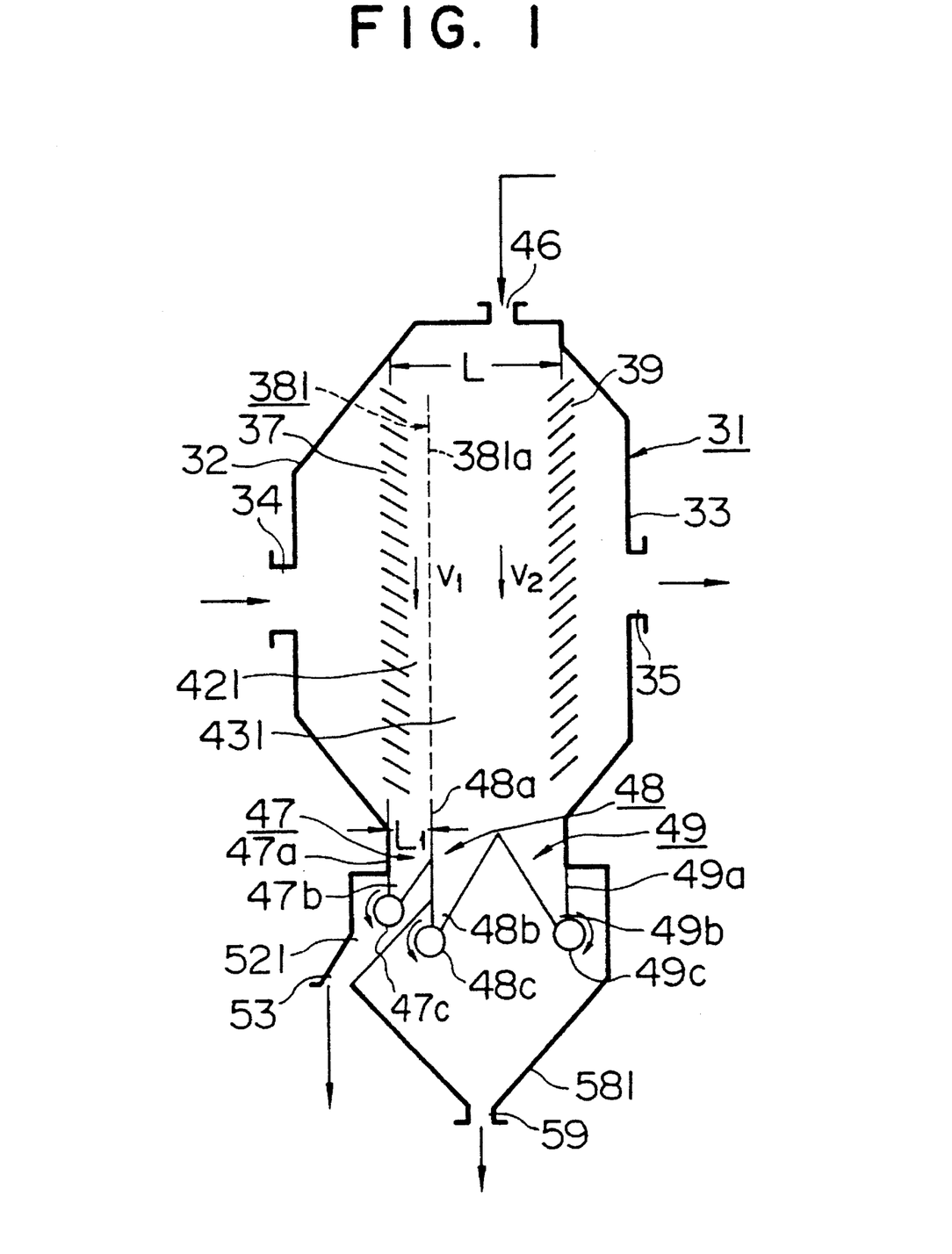
FIG. 1 is a sectional view of main parts of a desulfurizing and denitrating tower according to an embodiment of the present invention.
Figure 4:
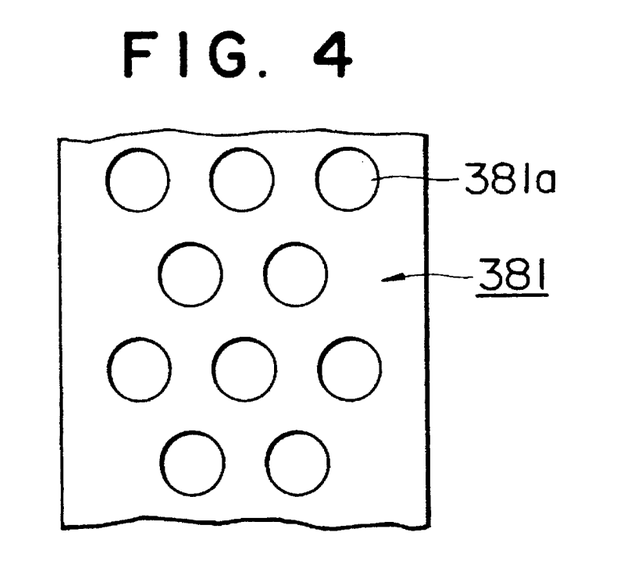
FIG. 4 is an enlarged view of a screen for use in the embodiment of the present invention.
Figure 5:
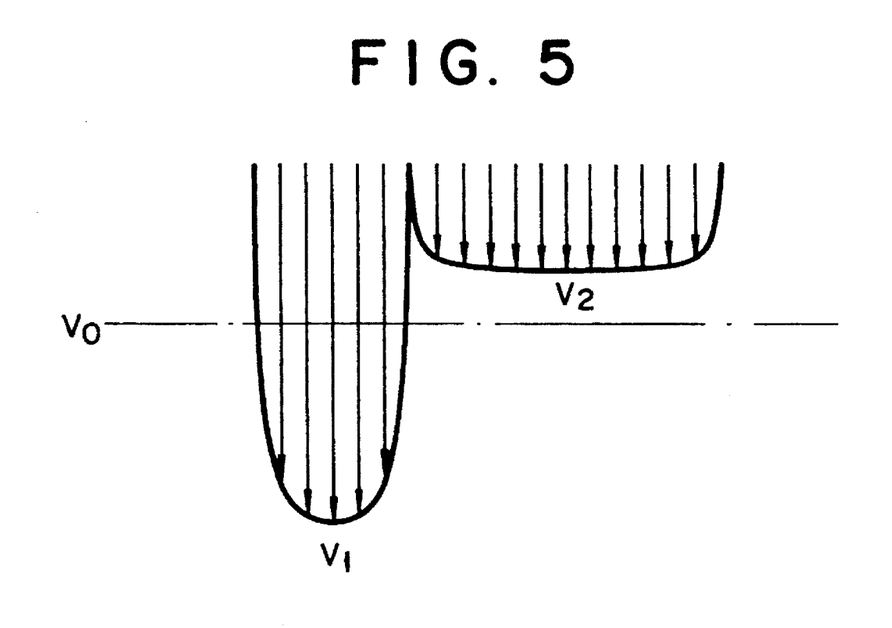
FIG. 5 is a diagram showing a moving speed of activated charcoals in a small chamber and a moving speed of activated charcoals in a large chamber according to the embodiment of the present invention.

FIG. 1 is a sectional view of main parts of a desulfurizing and denitrating tower according to the embodiment of the present invention, FIG. 4 is an enlarged view of a screen for use in the embodiment of the present invention, and FIG. 5 is a diagram showing a moving speed of activated charcoals in a small chamber and a moving speed of activated charcoals in a large chamber according to the embodiment of the present invention.

In FIG. 1, a processed gas introduction port 34 and a processed gas discharge port 35 are formed respectively in opposite side walls 32, 33 of a tower body 31. An inner space of the tower body 31 is partitioned by an inlet louver 37, a perforated plate 381 and an outlet louver 39 disposed parallel to each other, such that a small chamber 421 is defined between the inlet louver 37 and the perforated plate 381 and a large chamber 431 is defined between the perforated plate 381 and the outlet louver 39.

Activated charcoals (A.C.) as a carbon-base adsorbent are contained in each of the small chamber 421 and the large chamber 431, and are moved from above toward below in the small and large chambers 421, 431.

In the tower of this embodiment, a gas to be processed enters the small chamber 421 from the processed gas introduction port 34 through the inlet louver 37, and then enters the large chamber 431 through the perforated plate 381. The processed gas is sufficiently contacted with the activated charcoals in the large chamber 431, and then reaches the processed gas discharge port 35 after passing the outlet louver 39.

On the other hand, the activated charcoals for desulfurizing and denitrating the processed gas are supplied to the small chamber 421 and the large chamber 431 from a supply port 46 formed at an upper end of the tower body 31, and is moved downwardly in the small chamber 421 and the large chamber 431 to reach discharge hoppers 47 to 49.

The discharge hoppers 47 to 49 are each in the asymmetrical form, and have a side wall 47a extending vertically downwardly from a lower end of the inlet louver 37, a side wall 48a extending vertically downwardly from a lower end of the perforated plate 381, and a side wall 49a extending vertically downwardly from a lower end of the outlet louver 39, respectively. Further, the discharge hoppers 47 to 49 have first discharge ports 47b, 48b, 49b and discharge rollers 47c, 48c, 49c, each serving as a device for discharging the activated charcoals at a constant rate, are provided to be partly located in the first discharge ports 47b, 48b, 49b, respectively, thereby setting moving speeds of the activated charcoals in the small chamber 421 and the large chamber 431.

Thus, by rotating the discharge rollers 47c, 48c, 49c at a predetermined speed, the activated charcoals in each of the small chamber 421 and the large chamber 431 is moved downwardly at a set moving speed and is then discharged through the first discharge ports 47b, 48b, 49b. In this embodiment, the activated charcoals moved downwardly along the inlet louver 37, the outlet louver 39 and the perforated plate 381 are smoothly descended along the side walls 47a, 48a, 49a, respectively, and hence never stagnate in the tower.

The activated charcoals discharged through the first discharge port 47b is further discharged from a second discharge port 53 through a small chamber collective hopper 521. On the other hand, the activated charcoals discharged through the first discharge ports 48b, 49b are further discharged from a third discharge port 59 through a large chamber collective hopper 581.

Assuming now that the distance between the inlet louver 37 and the perforated plate 381 is $L_1$ and the distance between the inlet louver 37 and the outlet louver 39 is L, the distance $L_1$ is set to meet the following formula, as described later, depending on the adsorption power of the activated charcoals:

$$L_1 = 0.1 \cdot L \text{ to } 0.2 \cdot L$$

The activated charcoals each have a length of 6 to 12 [mm] and a diameter $d_o$ of 4.5 to 9.0 [mm]. Then, as shown in FIG. 4, the perforated plate 381 has a number of holes 381a whose diameter d is larger than the diameter $d_o$ of the activated charcoals and is set to meet the following formula:

$$d = 2 \cdot d_o \text{ to } 4 \cdot d_o$$

By so setting, it is possible not only to prevent the activated charcoals from entering the holes 381a and making the perforated plate 381 clogged, but also to prevent the activated charcoals in the large chamber 431 from moving into the small chamber 421 through the perforated plate 381. A vacancy rate of the perforated plate 381, that is, the ratio of the area of the holes to the area of the entire plate, is set to about 50 [%]. With such an arrangement, the activated charcoals in the small chamber 421 can be separated from the activated charcoals in the large chamber 431, whereby an increase in the pressure loss of the processed gas is prevented.

Also, assuming that an average moving speed $v_o$ of the activated charcoals is set to 100 to 300 [mm/hr] as with the prior art desulfurizing and denitrating tower, a moving speed $v_1$ of the activated charcoals in the small chamber 421 is set to meet the following formula:

$$v_1 = 2 \cdot v_o \text{ to } 4 \cdot v_o$$

Accordingly, the activated charcoals can be prevented from being loaded with dust contained in the processed gas in the vicinity of the inlet louver 37.

As shown in FIG. 5, a moving speed $v_2$ of the activated charcoals in the large chamber 431 is set to be lower than the average moving speed $v_o$.

A description will now be made on the relationship between a residing time of activated charcoals and a desulfurization rate.

Figure 6:
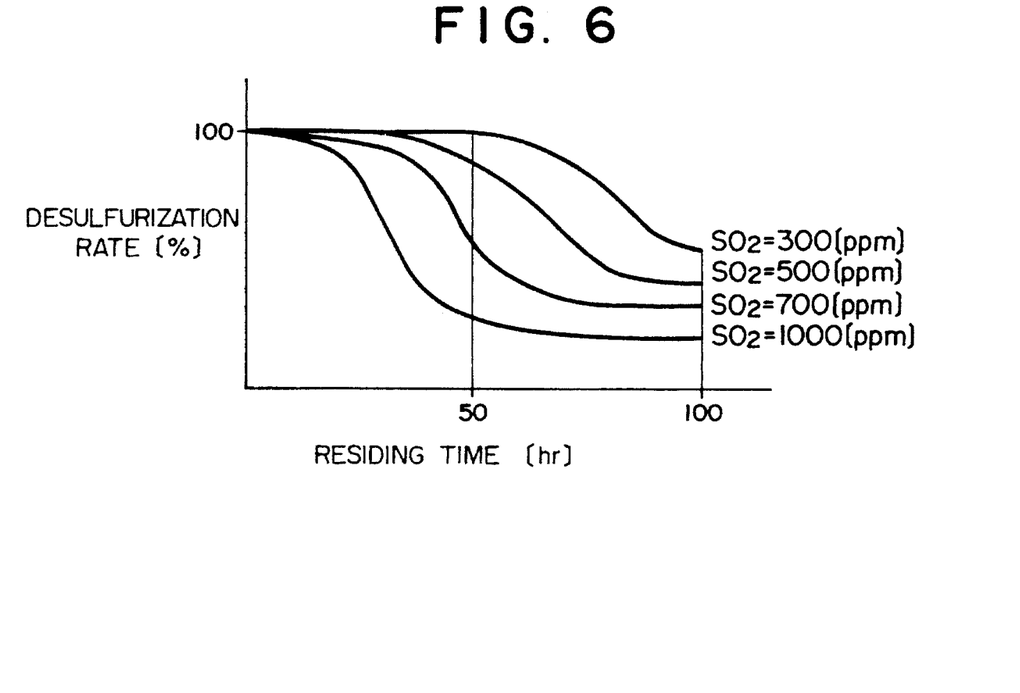
FIG. 6 is a graph showing the relationship between a residing time of activated charcoals and a desulfurization rate.

FIG. 6 is a graph showing the relationship between a residing time of activated charcoals and a desulfurization rate. In the graph, the axis of abscissas represents the residing time and the axis of ordinates represents the desulfurization rate.

In FIG. 6, each curve indicates the relationship between the residing time and the desulfurization rate as resulted when an $SO_2$ (sulfur dioxide) content in the processed gas is changed in the range of 300 to 1000 [ppm]. As will be seen from the graph, the desulfurization rate is reduced as the residing time is prolonged. In this connection, as the $SO_2$ content in the processed gas is increased, the desulfurization rate is reduced in a shorter time.

The adsorption power of activated charcoals when moved will now be described.

Figure 7:
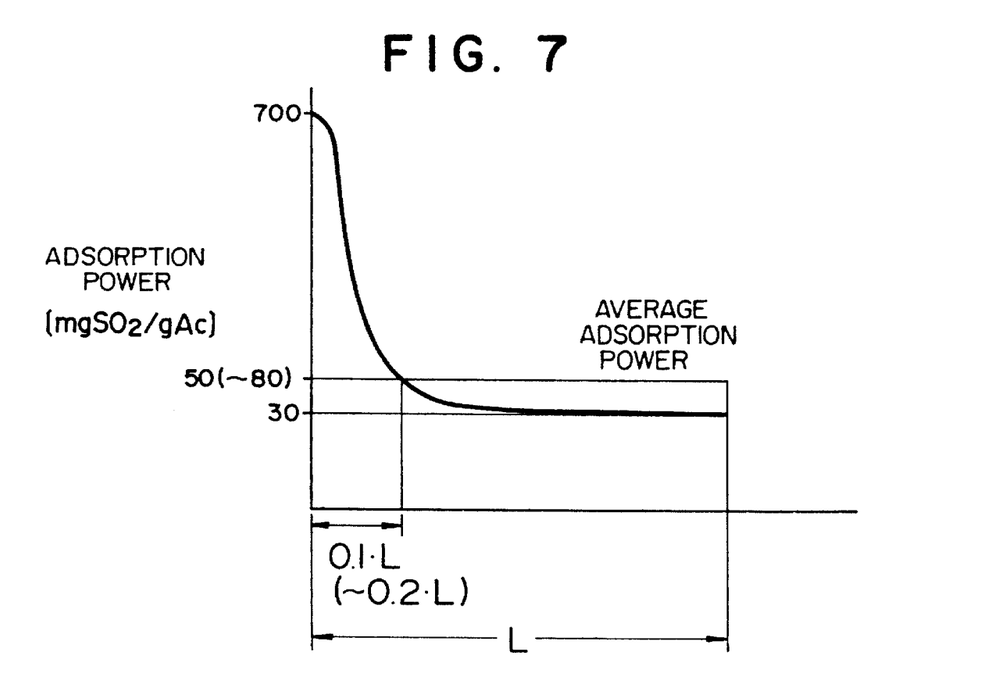
FIG. 7 is a graph showing the adsorption power of activated charcoals.

FIG. 7 is a graph showing the adsorption power of activated charcoals. In the graph, the axis of abscissas represents the distance from the inlet louver 37 (FIG. 1) and the axis of ordinates represents the adsorption power. Note that the adsorption power is represented by the weight [mg] of $SO_2$ which is adsorbed by 1 [g] of activated charcoals.

As will be seen from FIG. 7, when activated charcoals are moved from top toward bottom in the tower body 31 having the distance L between the inlet louver 37 and the outlet louver 39, the adsorption power of the activated charcoals in a region contacting the inlet louver 37 is 700 [mg $SO_2$/g A.C.], but it is reduced as the distance from the inlet louver 37 increases. At a position spaced from the inlet louver 37 by 0.1·L to 0.2·L, the adsorption power takes an average value of 50 to 80 [mg $SO_2$/g A.C.]. Then, the adsorption power in a region contacting the outlet louver 39 is 30 [mg $SO_2$/g A.C.].

Therefore, when the small chamber 421 is formed by providing the perforated plate 38 at the position spaced from the inlet louver 37 by 0.1·L to 0.2·L, the adsorption power of the activated charcoals in the small chamber 421 can be about 2.5 to 3 times greater than the average value.

Also, by setting the moving speed $v_1$ of the activated charcoals in the small chamber 421 to be 2 to 4 times higher than the average moving speed $v_o$, the residing time of the activated charcoals can be shortened and a drop of the desulfurization rate can be prevented.

As a result, most, i.e., 70 to 80%, of $SO_2$ in the processed gas can be adsorbed in the small chamber 421.

A description will now be made of the relationship of an $SO_2$ content versus a desulfurization rate and a denitration rate when activated charcoals are employed.

Figure 8:
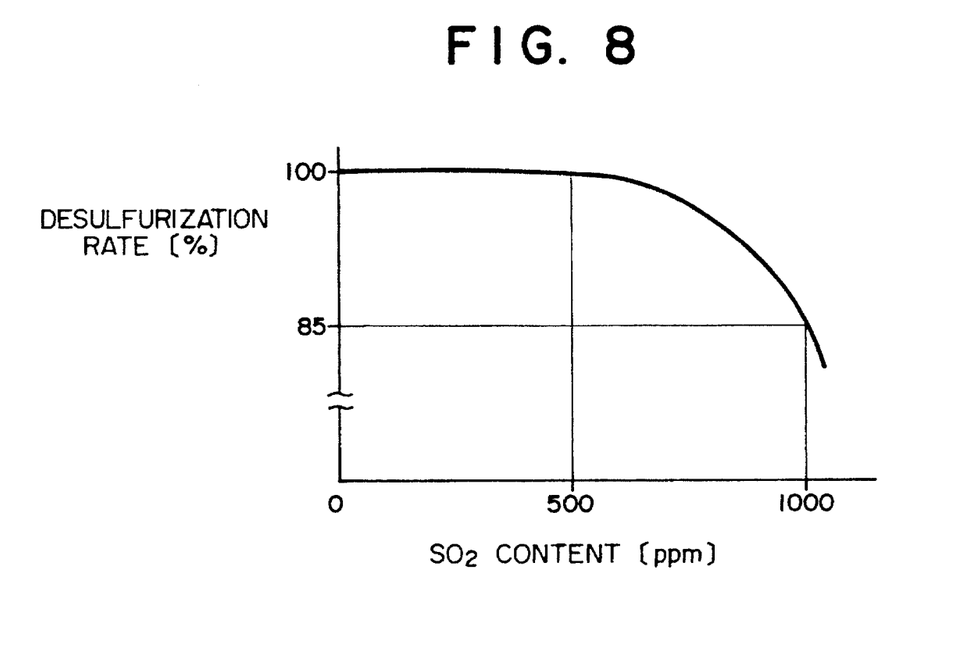
FIG. 8 is a graph showing the relationship between an $SO_2$ content and a desulfurization rate.
Figure 9:
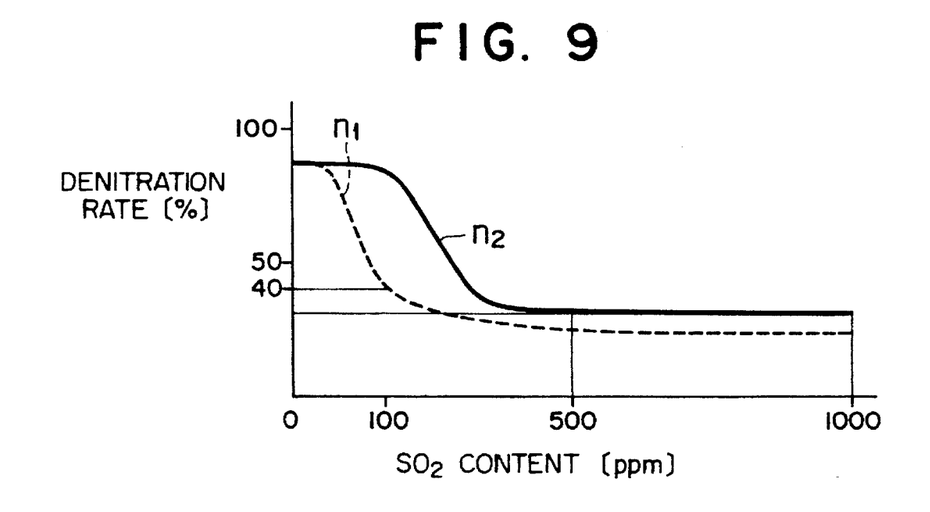
FIG. 9 is a graph showing the relationship between an $SO_2$ content and a denitration rate.

FIG. 8 is a graph showing the relationship between an $SO_2$ content and a desulfurization rate, and FIG. 9 is a graph showing the relationship between an $SO_2$ content and a denitration rate. In FIG. 8, the axis of abscissas represents the $SO_2$ content and the axis of ordinates represents the desulfurization rate. In FIG. 9, the axis of abscissas represents the $SO_2$ content and the axis of ordinates represents the denitration rate.

As shown in FIG. 8, at the $SO_2$ content less than 500 [ppm], the desulfurization rate is substantially 100 [%]. Even when the $SO_2$ content is 1000 [ppm], the desulfurization rate is still 85 [%]. Thus, the desulfurization rate is high irrespective of the $SO_2$ content.

On the other hand, the denitration rate is varied to a large extent depending on the $SO_2$ content.

More specifically, in FIG. 9, $\eta_1$ represents the denitration rate when an SV value indicating the space velocity is large, and $\eta_2$ represents the denitration rate when the SV value is small. Here, the SV value indicates a velocity of the processed gas passing through the activated charcoals per 1 [$m^3$] in units of [$Nm^2$/hr].

As will be seen from FIG. 9, when the $SO_2$ content is in excess of 100 [ppm], the denitration rate is quickly reduced.

Accordingly, the denitration rate in the large chamber 431 can be increased by sufficiently reducing the $SO_2$ content in the small chamber 421 (FIG. 1). In this embodiment, since the SV value in the large chamber 431 is about 10% larger than usual and the residing time of the activated charcoals is also about 10% prolonged, the desulfurization rate is reduced a little, but can be maintained at 50 [%] at minimum.

The result of comparing the prior art desulfurizing and denitrating tower with the desulfurizing and denitrating tower of the present invention will now be described.

When a processed gas with the $SO_2$ content of 500 [ppm] and the $NO_x$ (nitrogen oxides) content of 280 [ppm] was desulfurized and denitrated by the prior art desulfurizing and denitrating tower, the desulfurization rate was 99 [%] and the denitration rate was 25 [%]. In contrast, when the same gas was desulfurized and denitrated by the desulfurizing and denitrating tower of the present invention, the desulfurization rate was 100 [%] and the denitration rate was 50 [%]. Incidentally, the average residing time of activated charcoals was 45 [hr] in either case.

It is to be noted that the present invention is not limited to the above-described embodiment, but it may be variously modified in conformity with the gist of the present invention, and these modifications are not excluded from the scope of the invention.

As fully described hereinabove, according to the present invention, the desulfurizing and denitrating tower comprises an inlet louver, a perforated plate disposed near and parallel to the inlet louver so as to define a small chamber, an outlet louver disposed parallel to the perforated plate so as to define a large chamber, a constant-rate discharging device disposed below the small chamber for setting a moving speed of a carbon-base adsorbent in the small chamber, and a constant-rate discharging device disposed below the large chamber for setting a moving speed of a carbon-base adsorbent in the large chamber.

The moving speed of the carbon-base adsorbent in the small chamber is set to be 2 to 4 times greater than an average moving speed. Accordingly, the carbon-base adsorbent can be prevented from being loaded with dust contained in the processed gas in the vicinity of the inlet louver.

The distance from the inlet louver to the perforated plate is set to be 0.1 to 0.2 time the distance from the inlet louver to the outlet louver. Therefore, the $SO_2$ content can be sufficiently lowered in the small chamber. As a result, the denitration rate in the large chamber can be increased.

According to another aspect of the desulfurizing and denitrating tower of the present invention, the perforated plate has a number of holes whose diameter is set to be 2 to 4 times greater than the diameter of the carbon-base adsorbent. Accordingly, it is possible not only to prevent the carbon-base adsorbent from entering the holes and making the perforated plate clogged, but also to prevent the carbon-base adsorbent in the large chamber from moving into the small chamber through the perforated plate. As a result, the desulfurization rate and the denitration rate can be both increased.

What is claimed is:

1. A desulfurizing and denitrating apparatus comprising:

a tower body having a first side wall provided with an introduction port for a gas to be processed and a second side wall provided with a processed gas discharge port and disposed in opposite relation to said first side wall, an inlet louver provided in said tower body to face said first side wall, a perforated plate disposed in said tower body parallel to the inlet louver on the side away from said first side wall so as to define a first chamber between said inlet louver and said perforated plate, a first downwardly moving bed of carbon-base absorbent contained in said first chamber, an outlet louver disposed between said perforated plate and said second side wall in said tower body and parallel to said perforated plate, so as to define a second chamber, between said perforated plate and said outlet louver, which is larger than said first chamber, a second downwardly moving bed of carbon-base absorbent contained in said second chamber, a first constant-rate discharging device disposed below said first chamber which determines a downwardly moving speed of the first carbon-base absorbent in said first chamber, and a second constant-rate discharging device disposed below said second chamber which determines a downwardly moving speed of the second carbon-base absorbent in said second chamber, wherein said first constant-rate discharging device and said second constant-rate discharging device cooperate to cause the first carbon-base absorbent bed in said first chamber to move downwardly at a rate 2 to 4 times greater than an average moving speed of the carbon-base absorbent in both the first and the second beds.

2. A desulfurizing and denitrating apparatus according to claim 1, wherein a distance from said inlet louver to said perforated plate is set to be 0.1 to 0.2 time the distance from said inlet louver to said outlet louver.

3. A desulfurizing and denitrating apparatus according to claim 1 or 2, wherein said perforated plate has a number of holes whose diameter is set to be 2 to 4 times greater than a diameter of the carbon-base adsorbent.

4. A desulfurizing and denitrating apparatus according to claim 1, wherein said first constant-rate discharging device for said first chamber is disposed adjacent to an extension of said perforated plate and said second constant-rate discharging devices for said second chamber comprises two constant rate discharging devices disposed adjacent to extensions of said perforate plate and said outlet louver, respectively.

5. A desulfurizing and denitrating method comprising steps of:

introducing a feed gas in need of desulfurization and denitration through a gas introduction port in a first side wall of a tower body and thence through an inlet louvre disposed within said tower body substantially parallel to said first side wall;

downwardly moving a first bed of a carbon-base absorbent, through a first chamber defined by space between said inlet louvre and a perforated plate disposed within said tower body, and substantially parallel to said inlet louvre, in a direction transverse to the direction of movement of said feed gas;

transversely passing said feed gas through said first bed of a carbon-base absorbent under conditions sufficient to at least partially desulfurize and denitrate said feed gas to produce a partially processed gas;

passing said partially processed gas through said perforated plate;

downwardly moving a second bed of a carbon-base absorbent, through a second chamber, which is larger than said first chamber and which is defined by space between said perforated plate and an outlet louvre disposed within said tower body between said perforated plate and a second side wall having a gas discharge port therein and which is substantially parallel to said perforated plate, in a direction transverse to the direction of movement of said partially processed gas;

transversely passing said partially processed gas through said downwardly moving second bed of a carbon-base absorbent under conditions sufficient to at least partially further desulfurize and denitrate said partially processed gas to produce a product gas;

discharging said first absorbent through a first constant rate discharging device, disposed below said first chamber, at a first constant rate;

discharging said second absorbent through a second constant rate discharging device, disposed below said second chamber, at a second constant rate; and setting the relative downward discharge rates of said first and second carbon-base absorbents such that the downward moving speed of said first carbon-base absorbent in said first chamber is 2 to 4 times greater than an average downward moving speed of both of said first and second carbon-base absorbents.

* * * * *